United States Patent [19]

Okada et al.

[11] Patent Number: 5,412,267
[45] Date of Patent: May 2, 1995

[54] MINIATURE MOTOR AND METHOD OF MAKING SAME

[75] Inventors: Kazuo Okada; Keisuke Ebihara; Kazumasa Saiga, all of Matsudo, Japan

[73] Assignee: Mabuchi Motor Co., Ltd., Chiba, Japan

[21] Appl. No.: 61,434

[22] Filed: May 14, 1993

[30] Foreign Application Priority Data

May 21, 1992 [JP] Japan .................. 4-128366

[51] Int. Cl.$^6$ .............................................. H02K 5/04
[52] U.S. Cl. ................... 310/42; 310/40 MM; 310/89
[58] Field of Search ............. 310/40 MM, 42, 89; 29/596; 72/348, 349, 356, 708

[56] References Cited

U.S. PATENT DOCUMENTS 4,409,505  10/1983  Petersen ................. 310/90

FOREIGN PATENT DOCUMENTS 0176839  4/1986  European Pat. Off. ..... 310/40 MM 56-147775  11/1981  Japan .

*Primary Examiner*—Steven L. Stephan
*Assistant Examiner*—Judson H. Jones
*Attorney, Agent, or Firm*—McGlew and Tuttle

[57] ABSTRACT

A miniature motor including a motor case formed into a bottomed hollow cylindrical shape having a cross-sectional shape having two long sides consisting of two parallel lines (planar portions) and two short sides. An end bracket is fitted to an open end of the motor case. Permanent magnets are fixedly fitted to the cylindrical inside surface of the motor case. The inside surfaces of the permanent magnets, when assembled, form part of a cylindrical surface. An armature is rotatably supported in the motor case via bearings provided on the motor case and the end bracket. Recesses are provided on the inside of the parallel planar portions of the motor case and positioned in such a manner that a gap $g_1$ between the inside surfaces of the recesses and the armature is related to a gap $g_2$ between the inside surfaces of the permanent magnets and the armature by a relationship that $g_1$ $g_2$. A method is further proposed of making the motor in which the recesses are formed by ironing.

5 Claims, 3 Drawing Sheets

MINIATURE MOTOR AND METHOD OF MAKING SAME

BACKGROUND OF THE INVENTION AND RELATED ART STATEMENT

This invention relates generally to a miniature motor for use in audio equipment, video equipment, automotive electrical equipment, etc. and a method of making the same, and more particularly to a miniature motor having a motor case formed into a cross section consisting of two parallel straight lines (parallel planar portions); and two opposing concentric arc segments, and a method of making the same.

FIG. 1 is a perspective view illustrating the essential part of a miniature motor to which this invention is applied. In FIG. 1, reference numeral 1 refers to a motor case made of a metallic material, such as mild steel, and formed into a bottomed hollow cylindrical shape having flat portions 2 constituting parallel planes. Numeral 3 refers to an end bracket made of a resin material, formed into a plate shape, and fitted to an open end of the motor case 1. Numeral 4 refers to a rotating shaft fixedly fitted to the center of an armature (not shown) provided in the motor case 1 and rotatably supported by a bearing 9. On the end bracket 3; there are provided brushes, a bearing, input terminals, etc. (all of them are not shown).

FIG. 2 is a cross-sectional view illustrating the essential part of the miniature motor shown in FIG. 1. Like parts are indicated by like numerals shown in FIG. 1. In FIG. 2, the motor case 1 is formed into a shape having a cross section consisting of two parallel straight lines and two opposing concentric arc segments. Numeral 5 refers to permanent magnets made of ferromagnetic material, such as hard ferrite, formed into an arc segment shape, and fixedly fitted to the cylindrical inside surface of the motor case 1. Numeral 6 refers to an armature rotatably supported in the motor case 1. With the aforementioned construction, as current is fed from the input terminals (not shown) to the armature 6 via brushes (not shown), rotating force is imparted to the armature existing in a magnetic field formed by a pair of the permanent magnets 5 fixedly fitted to the cylindrical inside surface of the motor case 1, causing the armature 6 to rotate, and external equipment to be driven via the rotating shaft 4.

Since the miniature motor having the aforementioned construction has flat portions 2 on the motor case 1, it has an advantage that the distance L between the flat portions 2 and 2 can be made smaller than the outside diameter D of the motor case 1. Thus, the miniature motor having the aforementioned shape can be installed in a space smaller than that needed for the miniature motor of a cylindrical shape.

The outside diameter of the armature 6 must be such a size that intervention with the inside surface of the motor case 1 can be prevented when the thickness of the material for the motor case 1 is constant and the length L between the flat portions 2 and 2 is set to a predetermined length. And, once the outside diameter of the armature 6 is determined, the output torque is limited to a predetermined range, though there may be some differences depending on the magnetic properties of the permanent magnet 5. Consequently, the output torque generated is limited by the fact that the outside diameter of the armature 6 is limited by such a consideration as to prevent intervention with the inside surface of the motor case 1 in a miniature motor having the construction shown in FIG. 2.

To overcome the above problems, a construction in which notched portions 7 are provided on part of the flat portions 2 of the motor case 1, as shown in FIG. 3, has been proposed. A miniature motor of this construction has advantages that the outside diameter of the armature 6 can be increased, and as a result output torque can also be increased accordingly.

In a miniature motor of the construction shown in FIG. 3, however. the mechanical strength of the motor case 1 is naturally be lowered because of the notched portions 7. Furthermore, there is a danger of foreign matter entering inside the motor case 1 from the notched portions 7, leading to a seizure of the armature 6. Moreover, mechanical noise generated inside the motor case 1 may leak to the outside from the notched portions 7. This could result in a remarkable deterioration in acoustic properties when a miniature motor is used to drive audio equipment.

SUMMARY OF THE INVENTION

It is the first object of this invention to provide a miniature motor which requires only a small mounting space.

It is the second object of this invention to provide a miniature motor which can prevent foreign matter from entering into the inside, and mechanical noise from leaking to the outside.

It is the third object of this invention to provide a miniature motor which can increase output torque.

Lit is the fourth object of this invention to provide a method of making the aforementioned miniature motor with ease and high accuracy.

DETAILED DESCRIPTION OF THE EMBODIMENTS

Figure 1:
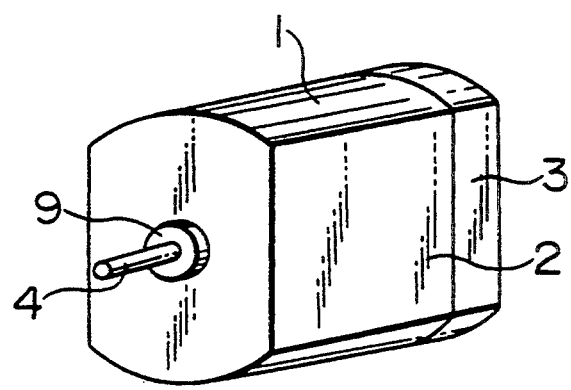
FIG. 1 is a perspective view illustrating the essential part of a miniature motor to which this invention is applied.
Figure 2:
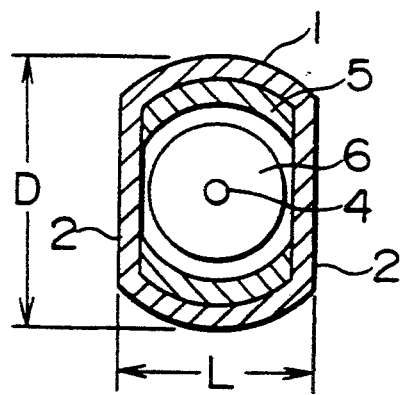
FIG. 2 is a cross-sectional view illustrating the essential part of the miniature motor shown in FIG. 1.
Figure 3:
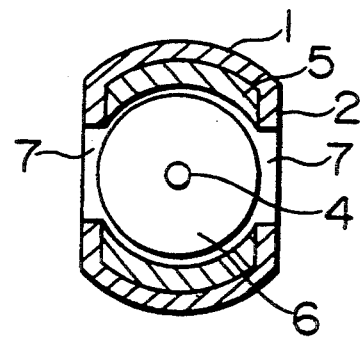
FIG. 3 is a cross-sectional view illustrating the essential part of another example of a conventional-type miniature motor.
Figure 4:
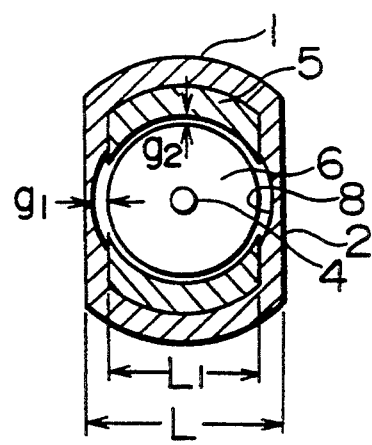
FIG. 4 is a cross-sectional view illustrating the essential part of an embodiment of this invention.

FIG. 4 is a cross-sectional view illustrating the essential part of an embodiment of this invention. Like parts are indicated by like numerals used in FIGS. 1 through 3. In FIG .4, numeral 8 denotes recesses formed into a concentric cylindrical shape, for example, on the inside surfaces of the flat portions 2 and positioned so that a gap $g_1$ between the recess 8 and the motor case 1 is related to a gap $g_2$ between the permanent magnet 5 and the armature 6 by a relationship that $g_1 \geq g_2$.

With this construction, the outside diameter of the armature 6 can be made larger than the distance $L_1$ between the parallel planes of the flat portions 2, thus increasing output torque. Although the thickness of the flat portions 2 is slightly reduced by providing the recesses 8 on the motor case 1, the mechanical strength of the motor case is hardly lowered because the cross-sectional shape of the motor case 1 still remains to be a continuous closed section.

Figure 5:
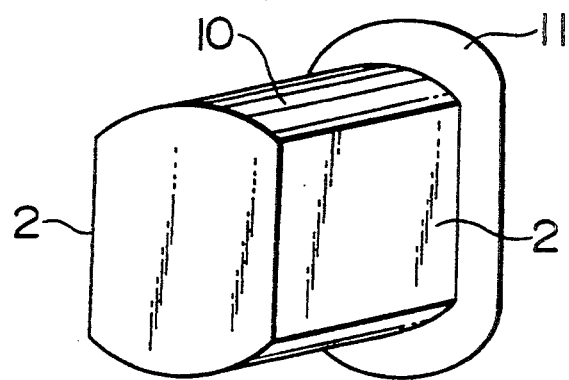
FIG. 5 is a perspective view illustrating an example of drawn motor case in an embodiment of this invention.
Figure 6:
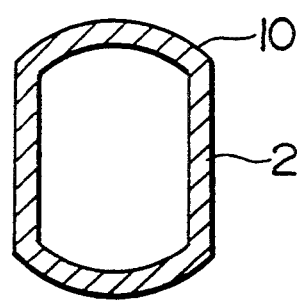
FIG. 6 is a cross-sectional view of the drawn motor case shown in FIG. 5.

FIG. 5 is a perspective view illustrating an example of a drawn motor case in an embodiment of this invention. FIG. 6 is a cross-sectional view of the drawn motor case shown in FIG. 5. Like parts are indicated by like numerals shown in FIG. 1 through 3. In FIGS. 5 and 6, a drawn motor case 10 is formed into a bottomed hollow cylindrical shape by drawing a steel sheet using a publicly known drawing metal die, for example. Numeral 11 denotes a flange generated during drawing operation, which will be trimmed off upon completion of ironing operation, which will be described later.

Figure 7:
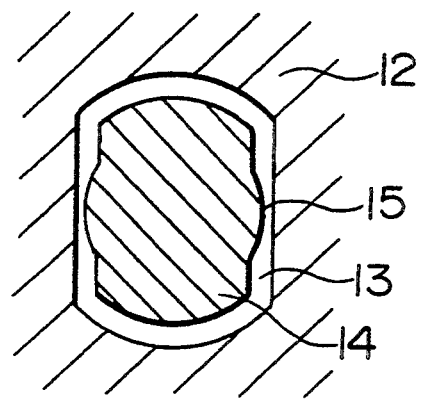
FIG. 7 is a cross-sectional view illustrating the essential part of an ironing metal die in an embodiment of this invention.

FIG. 7 is a cross-sectional view illustrating the essential part of an ironing metal die in an embodiment of this invention. In FIG. 7, numeral 12 denotes a die made of tool steel, for example, in which an ironing space 13 formed into a cross-sectional inside contour corresponding to the cross-sectional outside contour of the motor case 1 shown in FIG. 4. Numeral 14 denotes a punch made of tool steel and formed into a cross-sectional outside contour corresponding to the cross-sectional inside contour of the motor case 1 shown in FIG. 4. Numeral 15 denotes a protrusion formed into a concentric arc segment in cross section.

Figure 8:
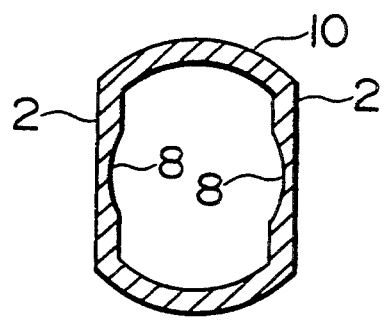
FIG. 8 is cross-sectional view illustrating an ironed motor case in an embodiment of this invention.

When a drawn motor case 10 shown in FIG. 5 is charged into the ironing space 13 of the ironing metal die having the aforementioned construction, and the punch 14 is advanced into the die 12, the protrusion 15 on the punch 14 causes part of the drawn motor case 10 to be plastically deformed. Recesses 8 as shown in FIG. 8 are formed by this so-called ironing operation. The outside dimensions of the protrusion 18 in FIG. 7 is larger than the distance $L_1$ between the parallel planes of the flat portions of the motor case 1 shown in FIG. 4, and smaller than the distance L between the flat portions 2 and 2.

Although description has been made in this embodiment about the motor case 1 having a cross-sectional shape consisting of two parallel straight lines and two opposing concentric arc segments, the motor case 1 may have a rectangular cross-section consisting of two each of long sides and short sides. Furthermore, although an example where each of the recesses 8 provided inside the motor case 1 is formed into a concentric cylindrical surface is shown in this embodiment, the cross-sectional shape of the recess 8 may be of any other shape than arc-segment shape so long as the minimum thickness of the flat portions 2 of the motor case 1 is insured to maintain enough strength.

This invention having the above-mentioned construction and operation has the following advantages.

(1) By forming recesses inside the motor case, the outside diameter of the armature can be increased, compared with the prior art, and thereby output torque can be increased.

(2) There is no need for providing notched portions on the flat portions of the motor case, as in the case of the prior art. This helps maintain the strength of the motor Case and prevent foreign matter from entering from the outside and mechanical noise from leaking to the outside.

(3) Since the recesses are formed in the motor case by ironing means that involves only local plastic deformation, the forming process is easy and the dimensional accuracy of forming is extremely high.

What is claimed is:

1. Miniature motor, comprising:
a motor case formed into a bottomed hollow cylindrical shape;
a motor case having a cross-sectional shape with two long sides consisting of two parallel straight lines and two short sides; an end bracket fitted to an open end of said motor case; permanent magnets fixedly fitted to an inside surface of said motor case, an inner surface of said permanent magnets forming a part of an inner cylindrical surface in an assembled state; an armature rotatably supported in said motor case via bearings provided on said motor case and on said end bracket; recesses formed on parallel surfaces inside surfaces of said motor case, said motor case being formed by a drawing operation and ironing parallel to plastically deform material to form said recessess said recesses defining part of said inner cylindrical surface which part is concentric with an axis of said motor case, said recesses being formed on parallel inside surfaces of said motor case and being positioned to define a gap $g_1$ between inside surfaces of said recess and said armature, said gap being related to a gap $g_2$ formed between inside surfaces of said permanent magnets and said armiture by relationships that $g_1 \geq g_2$.

2. A miniature motor as set forth in claim 1 wherein the outside diameter of said armature is made larger than the distance between parallel inside surfaces constituting flat portions of said motor case.

3. A miniature motor as set forth in claim 1 wherein said motor case 1 is formed into a continuous closed cross section.

4. A method of making a miniature motor comprising a motor case formed into a bottomed hollow cylindrical shape having a cross-sectional shape of two long sides consisting of two parallel straight lines and two short sides, an end bracket fitted to an open end of said motor case, permanent magnets fixedly fitted to the cylindrical inside surface of said motor case and having inside surfaces formed into a cylindrical surface, and an armature rotatably supported in said motor case via bearings provided on said motor case and said end bracket, characterized in that said motor case is formed by drawing, and recesses are formed by ironing on parallel inside surfaces of said motor case and positioned in such a manner that a gap $g_1$ between inside surfaces of said recesses and said armature is related to a gap $g_2$ between inside surfaces of said permanent magnets and said armature by a relationship that $g_1 \geq g_2$.

5. A method of making a miniature motor as set forth in claim 4 wherein ironing is performed using a punch formed into a cross-sectional outside contour corresponding to the cross-sectional inside contour of a motor case being formed, and a die formed into a cross-sectional inside contour corresponding to the cross-sectional outside contour of said motor case being formed.

* * * * *